United States Patent [19]

Pav et al.

[11] Patent Number: 4,964,202
[45] Date of Patent: Oct. 23, 1990

[54] HEATABLE ROLL FOR USE IN CALENDERS AND THE LIKE

[75] Inventors: Josef Pav; Reinhard Wenzel, both of Krefeld; Hans Bresser, Kerken; Rudolf Vossmerbäumer, Krefeld, all of Fed. Rep. of Germany

[73] Assignee: Kleinewefers GmbH, Krefeld, Fed. Rep. of Germany

[21] Appl. No.: 344,261

[22] Filed: Apr. 27, 1989

[30] Foreign Application Priority Data

May 2, 1988 [DE] Fed. Rep. of Germany ....... 3814794

[51] Int. Cl.⁵ ............................................. B21B 13/02
[52] U.S. Cl. .................................. 29/116.2; 29/116.1; 29/113.2; 100/93 RP; 100/162 B
[58] Field of Search ............... 29/116.1, 116.2, 113.1, 29/113.2; 100/93 RP, 162 B, 170; 72/245; 415/110, 111, 112, 175, 177

[56] References Cited

U.S. PATENT DOCUMENTS

| | | | |
|---|---|---|---|
| 4,328,744 | 5/1982 | Pav et al. | 100/162 B |
| 4,389,933 | 6/1983 | Pav | 100/162 B |
| 4,394,793 | 7/1983 | Pav et al. | 29/116 AD |
| 4,520,723 | 6/1985 | Pav et al. | 100/162 B |
| 4,625,637 | 12/1986 | Pav et al. | 100/47 |
| 4,757,584 | 7/1988 | Pav et al. | 29/116 A |
| 4,821,384 | 4/1989 | Arav | 29/113.2 |

FOREIGN PATENT DOCUMENTS 3014891 10/1981 Fed. Rep. of Germany.
3340683 6/1984 Fed. Rep. of Germany.

*Primary Examiner*—Joseph M. Gorski
*Assistant Examiner*—S. Thomas Hughes
*Attorney, Agent, or Firm*—Peter K. Kontler

[57] ABSTRACT

A calender roll wherein a cylindrical shell is rotatably mounted on a stationary carrier by way of bearings which are disposed in the end portions of the shell. The median portion of the shell is heated by a first heating device, and the end portions of the shell are heated by a discrete second heating device. The second heating device has channels which are provided in the end portions of the shell and/or indictive heaters which are adjacent to the exterior of the end portions of the shell. Alternatively or in addition to such expedients, the second heating device can include the bearings in the end portions of the shell; each such bearing includes or constitutes an axial or radical hydrostatic bearing which is heated by hydraulic fluid to thereby heat the respective end portion of the shell. The second heating device ensures that the effective length of the shell approximates or even matches the axial length of the shell.

24 Claims, 4 Drawing Sheets

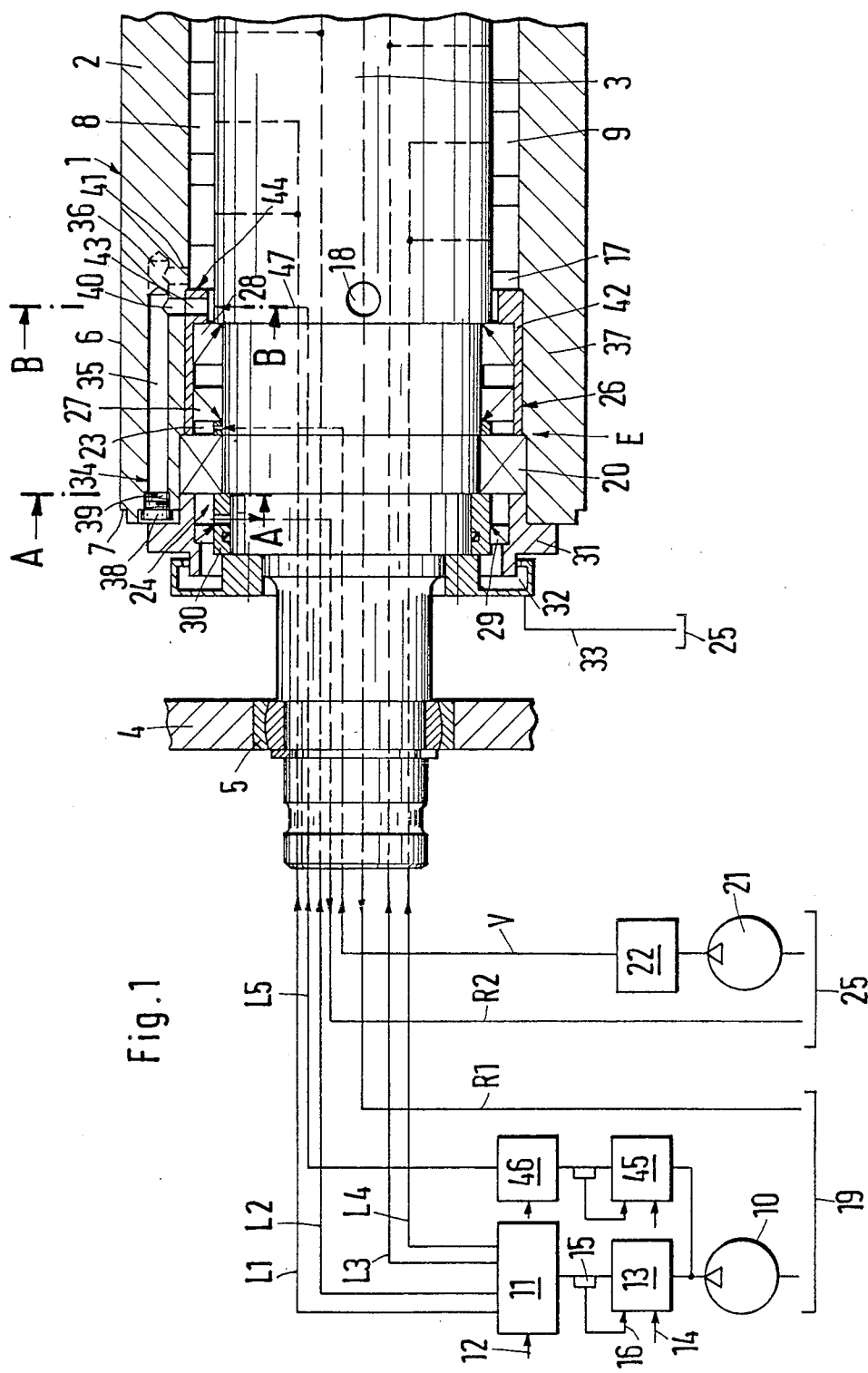

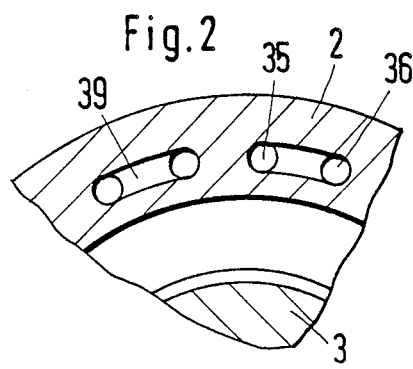
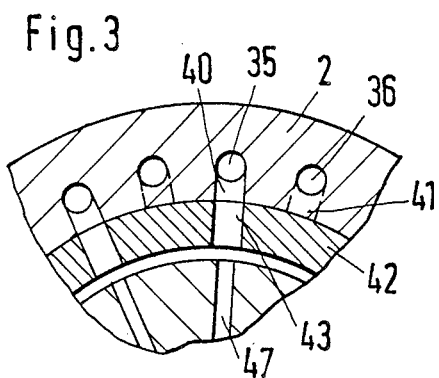
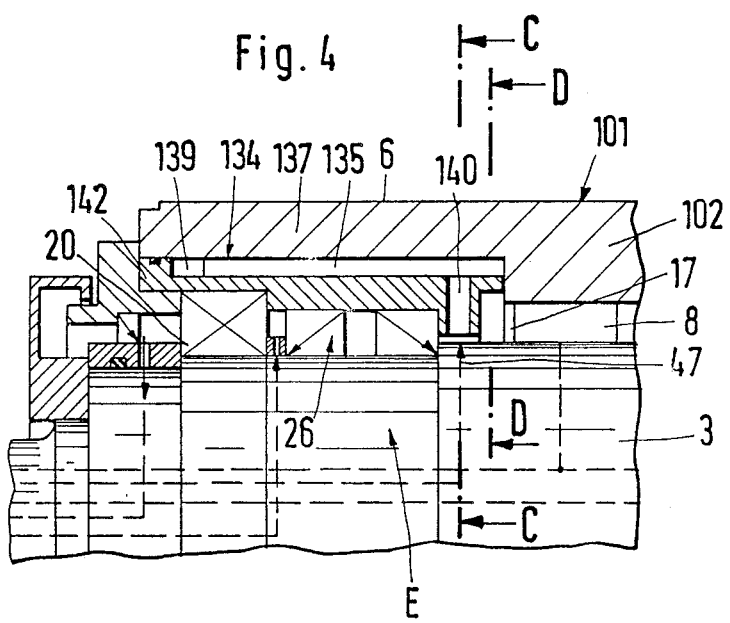
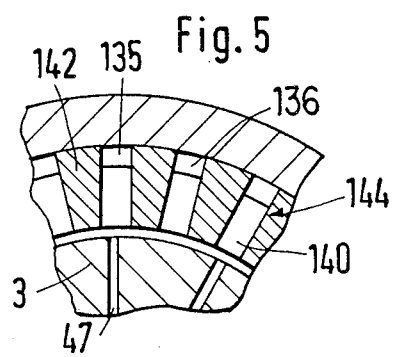
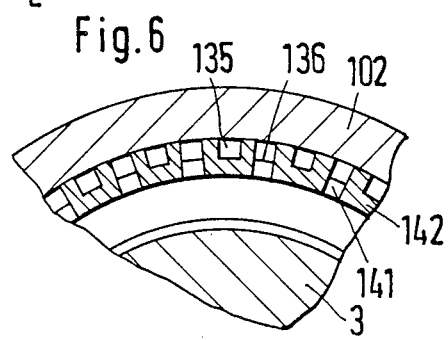

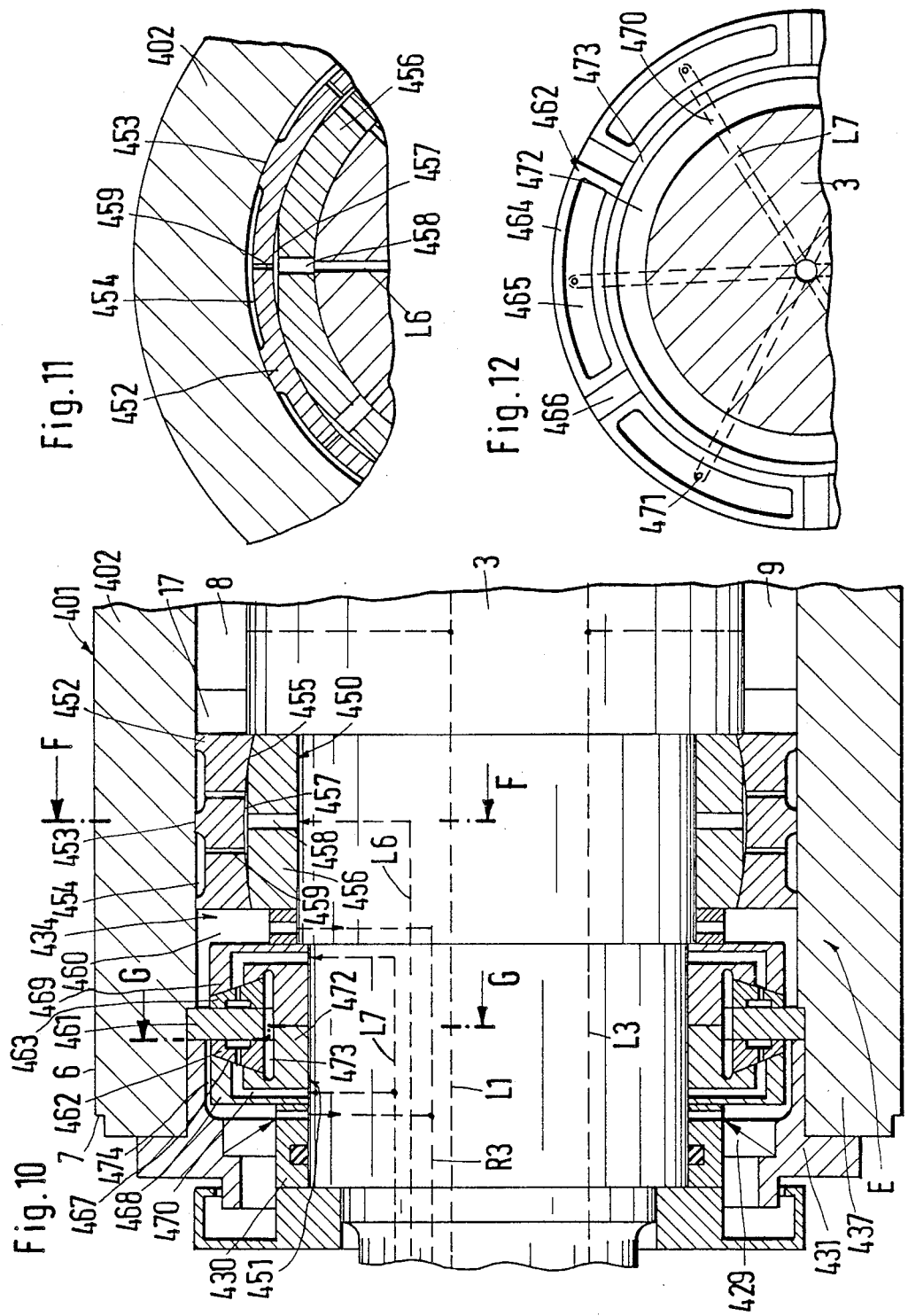

HEATABLE ROLL FOR USE IN CALENDERS AND THE LIKE

BACKGROUND OF THE INVENTION

The invention relates to improvements in rolls for use in calenders and like machines wherein webs of paper, plastic, textile or other material are caused to advance through the nip or nips of one or more pairs of rolls. More particularly, the invention relates to improvements in heatable rolls for use in calenders and like machines.

Commonly owned U.S. Pat. No. 4,757,584 to Pav et al. discloses a roll wherein the internal space of a hollow cylindrical shell, which is rotatable about a stationary carrier, receives at least two sets of hydrostatic bearing elements which are installed between two inserts. The inserts include antifriction bearings for the end portions of the shell, and twin sealing elements which prevent lubricant for the antifriction bearings from reaching the hydraulic fluid flowing to, in and from the hydrostatic bearing elements between the inserts. The median portion of the shell can be heated by such hydraulic fluid. The purpose of hydrostatic bearing elements is to permit adjustments of the width of the nip or nips which the cylindrical external surface of the roll defines with one or more neighboring rolls. An advantage of the patented roll is that hydraulic fluid which is used to change the configuration of the roll (by admitting pressurized hydraulic fluid to selected bearing elements and/or by permitting hydraulic fluid to escape from selected bearing elements) also forms part of the means for heating the median portion of the shell, either alone or in conjunction with additional heating means. The useful length of the external surface of the roll is that between the two inserts. In other words, the useful portion of the nip or nips between the patented roll and one or more adjacent rolls does not exceed the distance between the inserts in the end portion of the shell.

It is often necessary to heat the fluid which is supplied to the hydrostatic bearing elements to an elevated temperature in the range of 250° to 350° C. When the median portion of the shell is heated by a hydraulic fluid which is supplied at such elevated temperatures, the effective width of the nip or nips which are defined by the external surface of the shell is even less than the distance between the two inserts. The reason is that the temperature of the shell decreases rather abruptly in regions which are adjacent the inserts. Consequently, the actual length of the roll must greatly exceed the effective width of the nip or nips, and this contributes significantly to space requirements and initial and maintenance cost of the roll as well as to the space requirements and cost of the entire machine in which the roll is put to use. This also necessitates the use of a frame wherein the two lateral frame members are disposed at a considerable distance from each other, especially if the machine embodying the roll is used for the treatment of wide or extremely wide webs of paper, plastic material, fabric or the like. The cost of regulating the configuration of the shell in a heated calender roll increases with the length of the roll, and the accuracy of regulation is also affected if the roll must employ a long shell because only the median portion of the shell can be heated with a requisite degree of predictability. Moreover, a calender or a like machine with long or extremely long rolls cannot be readily installed in many existing plants.

OBJECTS OF THE INVENTION

An object of the invention is to provide a roll wherein the difference between the effective and actual lengths of the shell is less than in heretofore known rolls.

Another object of the invention is to provide a novel and improved heatable roll for use in calenders and like machines.

A further object of the invention is to provide novel and improved means for heating the roll of a calender or the like.

An additional object of the invention is to provide novel and improved means for heating selected portions of the shell in a roll for calenders and the like.

A further object of the invention is to provide a calender or like machine which embodies the above outlined roll.

Another object of the invention is to provide a novel and improved shell for use in the above outlined roll.

An additional object of the invention is to provide novel and improved inserts for use in the shell of the above outlined roll.

A further object of the invention is to provide novel and improved bearings for the end portions of the shell in the above outlined roll.

SUMMARY OF THE INVENTION

The invention is embodied in a roll which can be used in calenders and like machines. The improved roll comprises a hollow tubular shell having an internal space and first and second end portions adjacent the end faces of the shell, first and second inserts which are installed in the first and second end portions, respectively, a first heating device having means for heating the shell between the inserts, and a discrete second heating device for heating the shell in the region of each of its end portions.

The shell has a preferably cylindrical external surface which cooperates with the external surface of at least one adjoining roll to define a nip for a running web of paper, plastic material, textile or the like. Still further, the roll normally comprises a carrier for the shell. The latter surrounds the carrier and is rotatable relative thereto. The first heating device can comprise hydrostatic bearing elements which are disposed in the internal space of the shell between the two inserts, a source of hydraulic fluid, means for heating the fluid, and means for conveying fluid from the fluid heating means to the hydrostatic bearing elements.

Each insert takes up a predetermined length of the internal space in the axial direction of the shell, and the external surface of the shell preferably extends around the internal space between the two inserts and also along at least 50 percent of each predetermined length of the internal space.

In accordance with one presently preferred embodiment, the second heating device includes at least one inductive heater outwardly adjacent each end portion of the shell, i.e., the end portions of the shell can be heated from the outside.

In accordance with another presently preferred embodiment, each insert can comprise at least one hydrostatic bearing and the second heating device then comprises a source of hydraulic fluid, means for heating the fluid, and means for conveying heated fluid to the hydrostatic bearings. The bearings can be provided with fluid-containing pockets which are inwardly adjacent the respective end portions of the shell. Each such bearing can constitute an annular bearing. The bearings define for the heated fluid paths which extend along the internal surfaces of the respective end portions of the shell.

Each insert can comprise at least one ring-shaped member which is in heat-exchanging contact with the respective end portion of the shell and has an internal surface. The hydrostatic bearings of the inserts define for the heated fluid paths which extend along the internal surfaces of the respective ring-shaped members.

If the hydrostatic bearings are or include radial bearings, each radial bearing can comprise at least one bearing ring with fluid-containing pockets which are adjacent the internal surface of the shell. Each radial hydrostatic bearing can further comprise a second bearing ring within the one bearing ring. The bearing rings of each radial bearing have abutting spherical surfaces, and the fluid conveying means can include at least one fluid distributing chamber between the spherical surfaces of the bearing rings in each radial bearing, at least one substantially radial channel provided in each second bearing ring and communicating with the respective distributing chamber, conduit means for supplying heated fluid to the channels, and at least one flow restricting passage provided in the one bearing ring of each radial bearing and connecting the respective distributing chamber with the respective pockets.

If the hydrostatic bearings of the inserts include or constitute axial bearings, each axial bearing can comprise a wall which is in heat-exchanging contact with the shell by way of the internal surface of the shell, at least one bearing ring which is adjacent the wall, and fluid-containing pockets between the bearing ring and the respective wall. The conveying means includes means for supplying heated fluid to the pockets. The wall and the bearing ring of each axial bearing preferably have substantially radially extending abutting surfaces, and the pockets are provided in at least one of the abutting surfaces. It is presently preferred to provide the pockets in the surfaces of the bearing rings and to affix the walls to the shell. Furthermore, it is presently preferred to provide each axial bearing with two bearing rings which flank the respective wall and each of which is provided with fluid-containing pockets adjacent the respective side of the wall.

The means for supplying heated fluid to the pockets of the axial bearings can comprise a substantially sealed first annular chamber adjacent the wall and the bearing ring or rings of each axial bearing, at least one second annular chamber disposed radially outwardly of each bearing ring, and channels which connect the first annular chamber with the respective second chamber or chambers. The channels preferably alternate with the pockets of the respective axial bearings in the circumferential direction of the shell. Each axial bearing can further comprise a stationary supporting ring for each bearing ring, and each supporting ring and the respective bearing ring can be provided with abutting spherical surfaces. Each axial bearing can further comprise a barrier which is radially inwardly adjacent the respective wall. The fluid supplying means for such axial bearings can comprise the aforementioned inner annular chambers which are disposed between the barriers and the respective walls, the aforementioned stationary carrier for the shell, and conduits provided in the carrier to supply heated fluid to the inner annular chambers. As mentioned above, each axial bearing can comprise two bearing rings which flank the respective wall, and each such bearing then preferably comprises a discrete supporting ring for each bearing ring. Each barrier is then flanked by the supporting rings of the respective bearing.

In accordance with still another presently preferred embodiment, the second heating device comprises channels which are provided only in the end portions of the shell, and means for circulating a heating fluid through the channels. Each end portion of the shell can be provided with a plurality of channels which are substantially or exactly parallel to the axis of the shell and are adjacent each other in the circumferential direction of the respective end portions of the shell. Each channel can include a bore or hole in the respective end portion of the shell.

Each end portion of the shell can include an outer tubular section and an inner tubular section within the respective outer tubular section, the channels are then disposed between the outer and inner tubular sections of each end portion.

The means for circulating heated fluid through the channels of the end portions of the shell can include at least one pump, particularly a centrifugal pump. The pump can be provided with substantially radially disposed nozzles having orifices which discharge heated fluid into at least some of the channels. The intake ends of such orifices are or can be disposed in the region of the internal surface of the shell. The channels can include open ends in the end faces of the respective end portions of the shell, and the means for circulating heated fluid in such channels can include at least one substantially radially extending passage which communicates with the channels of each end portion.

Instead of having open ends in the end faces of the respective end portions of the shell, the channels can be designed and distributed in the end portions in such a way that each end portion is provided with at least one first channel, at least one second channel, and a third channel which connects the first and second channels in the region of the end face of the respective end portion of the shell. The means for circulating heated fluid through such channels includes at least one fluid admitting inlet for the first channel in each end portion of the shell and at least one fluid receiving passage communicating with the second channel in each end portion of the shell. The passages are preferably remote from the respective end faces, the inlets are preferably nearer to and the passages are preferably more distant from the axis of the shell.

The second heating device can include at least one source of heated fluid, means for regulating at least one parameter (particularly the temperature and/or pressure) of heated fluid, and means for conveying heated fluid from the regulating means to the aforementioned hydrostatic bearings of the inserts or to the channels in the end portions of the shell. The conveying means can include at least one passage (e.g., a channel) in the carrier for the shell, at least one first fluid discharging nozzle communicating with the passage and disposed in the region of one end portion of the shell, and at least one second fluid discharging nozzle communicating with the passage and disposed in the region of the other end portion of the shell. The heating channels in the end portions of the shell have fluid-receiving inlets in register with the respective nozzles. The median portion of the internal surface of the shell can be disposed at a greater first distance from the axis of the shell, and the outer portions of the internal surface (namely the portions within the end portions of the shell) can be located at a lesser second distance from the axis. The inlets of the aforementioned nozzles have fluid receiving ends in the respective second portions of such internal surface. Such roll can further comprise partitions which are provided in and divide the internal space of the shell into a central portion which is surrounded by the median portion of the internal surface and outer portions within the outer portions of the internal surface. The partitions serve to seal the central portion of the internal space from the outer portions. The second heating device of the just described roll can further comprise second channels which are provided in each end portion of the shell and communicate with the respective heating channels. The second channels have fluid discharging outlets which are axially offset with reference to the inlets of the respective heating channels.

If each end portion of the shell includes an inner and an outer tubular section, the channels are preferably provided in the peripheral surface of each inner tubular section. At least one channel in each inner tubular section has a radially inwardly extending inlet for heated fluid. The inlets of such channels are preferably spaced apart from the respective end faces of the shell.

If the bearings of the inserts are friction or antifriction bearings which require lubrication, the roll further comprises means for lubricating such bearings. The lubricating means can include a source of lubricant and means for supplying lubricant from the source to the bearings at a first temperature which is below the temperature of heating fluid serving to heat the end portions of the shell. If the inserts comprise bearings which must be lubricated by grease or any lubricant other than heated fluid which is supplied to the hydrostatic bearing elements between the two inserts, the roll is provided with means for sealing the median portion of the internal space of the shell from the outer portions, namely from the portions which receive the inserts and their bearings. In accordance with a presently preferred embodiment, each sealing means comprises a first sealing lip which engages or is at least adjacent the bearing of the respective insert, and a second lip which is adjacent the median portion of the internal space.

The novel features which are considered as characteristic of the invention are set forth in particular in the appended claims. The improved roll itself, however, both as to its construction and the mode of heating the same, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary partly elevational and partly axial sectional view of a roll, such as a calendar roll, which embodies one form of the invention and wherein the device for heating the end portions of the shell includes channels which are machined into or otherwise formed directly in the end portions of the shell;

FIG. 2 is a fragmentary transverse sectional view substantially as seen in the direction of arrows from the line A—A of FIG. 1;

FIG. 3 is a fragmentary transverse sectional view substantially as seen in the direction of arrows from the line B—B of FIG. 1;

FIG. 4 is a fragmentary partly elevational and partly axial sectional view of a second roll wherein each end portion of the shell includes two tubular sections one of which is telescoped into the other and the one section has channels for a heating fluid;

FIG. 5 is a fragmentary transverse sectional view substantially as seen in the direction of arrows from the line C—C of FIG. 4;

FIG. 6 is a fragmentary transverse sectional view substantially as seen in the direction of arrows from the line D—D of FIG. 4;

FIG. 10 is a fragmentary partly elevational and partly axial sectional view of a fifth roll wherein the means for heating the end portions of the shell includes hydrostatic bearings forming part of the inserts;

FIG. 11 is a fragmentary transverse sectional view substantially as seen in the direction of arrows from the line F—F of FIG. 10; and FIG. 12 is a fragmentary transverse sectional view substantially as seen in the direction of arrows from the line G—G of FIG. 10.

DESCRIPTION OF PREFERRED EMBODIMENTS

Figure 7:
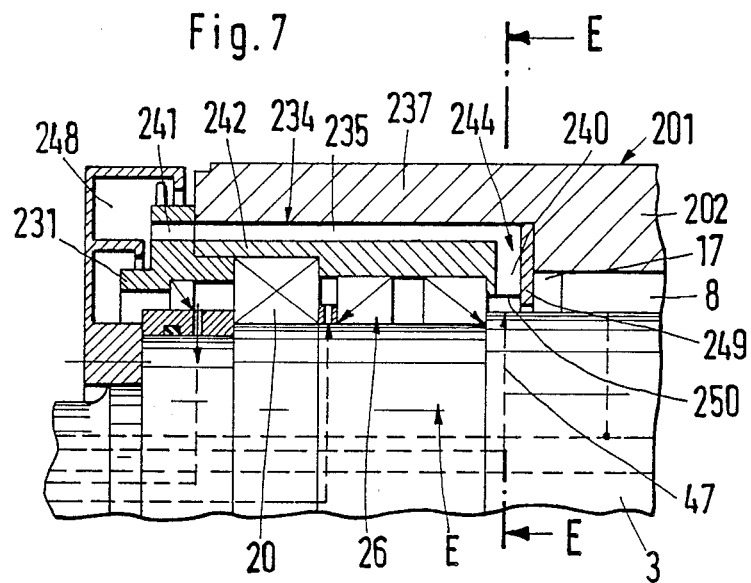
FIG. 7 is a fragmentary partly elevational and partly axial sectional view of a third roll which constitutes a modification of the roll of FIGS. 5 to 7.

The roll 1 which is shown in FIG. can be used in a calender or in a like machine and comprises a hollow cylindrical shell 2 surrounding and being rotatable relative to a normally stationary carrier 3 The end portions of the carrier 3 are mounted in spherical bearings 5 which are installed in the respective upright frame members 4 of the machine. FIG. 1 merely shows the left-hand portion of the roll 1; the right-hand end portion of the carrier 3 is mounted in a second spherical bearing which, in turn, is installed in the right-hand upright frame member of the machine. The two halves of the illustrated roll 1 are mirror images of each other.

The shell 2 has a cylindrical external working surface 6 which extends nearly all the way between its end faces, namely between two circumferentially complete annular shoulders 7. The external surface 6 cooperates with the external surface of a second roll (note the roll W in FIG. 9) to define an elongated nip for a running web of paper, textile, plastic or other material which is to be treated in the machine. The nip can extend all the way between the two shoulders 7 at the periphery of the shell 2.

The median portion of the internal space 17 of the shell 2 accommodates at least one row of primary hydrostatic bearing elements 8 which are adjacent the nip of the roll 1 with a second roll and are preferably assembled into two or more groups. By admitting a pressurized hydraulic fluid into, or by permitting hydraulic fluid to flow from, selected groups of primary bearing elements 8, an automatic control system can regulate the width of corresponding portions of the nip between the shoulders 7. The bearing elements 8 operate between the carrier 3 and the adjacent portions of the internal surface of the shell 2.

The median portion of the internal space 17 of the shell 2 further accommodates at least one row of secondary hydrostatic bearing elements 9 which are disposed substantially diametrically opposite the bearing elements 8 and are preferably assembled into two or more groups. By admitting pressurized hydraulic fluid into selected groups of secondary bearing elements 9, a control system can influence the width of the corresponding portion or portions of the nip between the shoulders 7 bounding the axial ends of the external working surface 6 on the shell 2. Suitable hydrostatic bearing elements and controls therefor are disclosed, for example, in German Offenlegungsschrift No. 30 14 891 and in numerous United States and foreign patent and patent applications of the assignee of the present application. Reference may be had, for example, to U.S. Pats. Nos. 4,328,744, 4,389,933, 4,394,793, 4,520,723 and 4,625,637.

Hydraulic fluid which is to be conveyed to selected bearing elements 8 and/or 9 is stored in a suitable source here shown as a tank 19. A pump 10 draws fluid from the tank 19 and delivers the fluid to supply conduits L1, L2 for the bearing elements 8 and to supply conduits L3, L4 for the bearing elements 9 (it is assumed here that the bearing elements 8 are assembled into two groups and that the bearing elements 9 are also assembled into two groups) by way of a system of valves 11. These valves control the pressure and the rate of flow of hydraulic fluid to selected supply conduits. The system of valves 11 has an input 12 for signals from a control unit (not shown) serving to select those groups of bearing elements 8, 9 which are to receive pressurized fluid or which are to be sealed from the heating device 13 and pump 10.

The temperature of fluid which is supplied to the conduits L1 to L4 is determined by the intensity and/or other characteristics of signals which are transmitted to the input 14 of the heating device 13. The actual temperature of fluid leaving the heating device 13 is monitored by a sensor 15 which transmits signals to a second input 16 of the heating device 13. The latter intensifies or reduces the heating action upon fluid which is delivered by the pump 10 when the characteristics of signals at the input 14 deviate from those at the output 16.

Each hydrostatic bearing element 8, 9 has at least one pocket which is adjacent the internal surface of the shell 2 and from which heated hydraulic fluid leaks into the median portion of the internal space 17. The central portion of the shell 2 is heated as a result of exchange of heat with fluid in the pockets of the bearing elements 8 an/or 9, and spent fluid which gathers in the internal space 17 of the shell 2 is returned to the source (tank) 19 by way of one or more radially extending channels 18 which are provided in the carrier 3 and connect the internal space 17 with a return conduit R1 serving to deliver spent fluid all the way to the source 19.

It will be seen that hydraulic fluid which is used to operate the hydrostatic bearing elements 8, 9 serves as a means for delivering heat to the median portion of the shell 2. The bearing elements 8, 9 can be said to form part of a first heating device which further includes the device 13, the pump 10, the system of valves 11, the conduits L1–L4 and R1, and the channel or channels 18 and serves to heat the median portion of the shell 2 to a desired temperature.

The end portions 37 of the shell 2 are rotatable on antifriction or friction bearings 20 which surround the respective portions of the carrier 3 and are adjacent the respective end faces of the shell. Since the very hot hydraulic fluid which is supplied by the conduits L1 to L4 is not suitable for use as a lubricant for the bearings 20, the roll 1 is provided with separate means for lubricating the bearings 20 with a lubricant having a temperature lower than that of hydraulic fluid which is used to heat the median portion of the shell 2. The lubricating means includes a source 25 in the form of a tank from which lubricant can be drawn by a pump 21. The pump 21 delivers lubricant to a supply conduit V by way of a cooling device 22. The conduit V delivers cooled lubricant to an annular chamber 23 which is adjacent the inner axial end of the bearing 20. The thus supplied lubricant flows axially through the bearing 20 and gathers in a second annular chamber 24 at the outer axial end of the bearing. The chamber 24 is connected with the source 25 by way of return conduit R2. The illustrated pump 21 can be used to supply lubricant to the bearing 20 of FIG. 1 as well as to the bearing in the other end portion of the shell 2. However, it is within the purview of the invention to provide a discrete lubricating means for the bearing in the right-hand end portion of the shell 2.

The bearing 20 in the end portion 37 which is shown in FIG. 1 is sealed from the median portion of the internal space 17 (i.e., from hydraulic fluid which leaks from the hydrostatic bearing elements 8 and 9 into the interior of the shell 2) by a composite sealing device 26 which is adjacent the chamber 23 and establishes a fluid-tight seal between the internal surface of the shell 2 and the external surface of the carrier 3. The sealing device 26 includes two discrete sealing elements 27 and 28. The sealing element 27 has at least one flexible elastic lip adjacent the chamber 23 (i.e., adjacent the bearing 20), and the sealing element 28 has at least one flexible elastic lip adjacent the median portion of the internal space 17. Reference may be had to aforementioned U.S. Pat. No. 4,757,584.

A further sealing element 29 is provided to seal the chamber 24 for spent lubricant from the atmosphere. The sealing element 29 is installed between a ring 30 on the carrier 3 and a ring 31 which is secured to the end portion 37 of the shell 2. An annular seal fluid collecting space 32 is adjacent the rings 30 and 31 to collect lubricant (if any) which happens to leak beyond the sealing element 29 toward the left-hand end of the shell 2. A conduit 33 serves to convey leak fluid from the space 32 into the source 25 or into a separate receptacle.

Each bearing 20 and the associated sealing device 26 together constitute an insert E which is installed in the respective end portion 37 of the shell 2 adjacent the respective end face of the shell. Such inserts E interfere with heating of the end portions 37 so that, in the absence of any undertakings to the contrary, the effective axial length of the external surface 6 (and of the nip or nips which the surface 6 defines with the external surface or surfaces of one or more adjoining rolls) would be much less than the distance between the two shoulders 7. The extent to which the inserts E influence the temperature of the end portions 37 depends from the intensity of heating action upon the median portion of the shell 2 (by the heating device including the hydrostatic bearing elements 8 and 9) and also from the intensity of cooling action upon lubricant in the cooling device or devices 22. Thus, if the temperature of heated fluid which is supplied by the conduits L1 to L4 is very high and the temperature of lubricant which is delivered by the supply conduit V is much lower, the effective length of the external surface 6 of the shell 2 will be much less than the distance between the shoulders 7, i.e., the actual length of the roll 1 will greatly exceed its effective length (the length of the nip or nips between the roll and one or more adjacent rolls). On the other hand, uniform heating of the shell 2 all the way between its end faces, or practically all the way between such end faces, is desirable and advantageous because this renders it possible to reduce the overall length of the roll and the width of the machine in which the roll is put to use.

In accordance with a feature of the invention, the roll 1 is equipped with a discrete second heating device 34 which ensures that the temperature of the end portions 37 of the shell 2 matches or very closely approximates the temperature of the median portion of the shell so that the effective length of the nip or nips at the periphery of the roll 1 equals or approximates the distance between the shoulders 7. The heating device 34 includes a plurality of axially parallel channels 35 and 36 in the form of bores or holes which are machined into or are otherwise formed in each end portion 37 of the shell 2 and each of which has an open end in the end face of the respective end portion 37. The channels 36 alternate with the channels 35 in the circumferential direction of the shell 2, and each channel extends along the full length of that portion of the shell which surrounds the respective insert E (including a bearing 20 and the adjacent sealing means 26). Threaded plugs 38 or other suitable sealing elements are provided to fluidtightly seal the open ends of the channels 35 and 36. A circumferentially extending channel 39 (see also FIG. 2) is provided adjacent the plugs 38 to connect the respective end portions of each pair of neighboring channels 35 and 36.

That end portion of each channel 35 which is remote from the respective connecting conduit 39 is provided with a radially inwardly extending inlet 40 for heated fluid, and that end portion of each channel 36 which is remote from the respective connecting channel 39 is provided with a radially inwardly extending outlet 41 serving as a passage for reception of spent fluid. The inlets 40 and the outlets 41 are outwardly adjacent a separable sleeve-like tubular section 42 of the shell 2 which surrounds the sealing means 26. As can be seen in FIG. 3, the tubular section 42 has radially extending bores 43 which constitute extensions of the inlets 40 and are coplanar with the orifice of a nozzle 47 in the carrier 3. The tubular section 42 can be said to form part of a centrifugal pump 44 which serves to propel heated hydraulic fluid from the orifice of the nozzle 47, through successive extensions 43 of the tubular section 42, into the inlets 40 of the respective channels 35, thereupon through the channels 35, 39, 36, and through the outlets or passages 41 of the channels 36 into the respective end portion of internal space 17 in the shell 2. Spent hydraulic fluid which is discharged by the outlets 41 is returned into the source 19 by the conduit R1.

The stream of hydraulic fluid which is discharged by the pump 10 is divided into a first flow entering the heating means 13 and a second flow entering a discrete second heating means 45 analogous to the heating means 13, i.e., the heating means 45 also comprises two inputs, one for signals which denote the desired temperature of fluid flowing toward the channels 35 and the other for signals which denote monitored temperature of such fluid ahead of a second system of valves 46 having an input for signals which control the rate and/or pressure of fluid flowing into the channels 35. The system of valves 46 regulates the rate of admission of heated fluid into a supply conduit L5 which delivers heated fluid to the nozzle or nozzles 47 of the centrifugal pump 44. All extensions 43 and inlets 40 are located in a common plane extending at right angles to the axis of the shell 2, and the orifice of each nozzle 47 is also located in such plane so that the nozzle or nozzles 47 can inject streamlets of heated fluid into successive extensions 43 when the tubular section 42 of the sleeve 2 rotates with reference to the carrier 3. Streamlet(s) of pressurized hydraulic fluid which is (or are) discharged by the orifice(s) of the nozzle(s) 47 contributes or contribute to propelling action upon the fluid flowing in the channels 35, 36 and 39. The temperature of the end portions 37 of the shell 2 can be regulated with a high degree of accuracy and within a wide range by appropriate adjustment of the valves 46 and heating means 45.

The second heating device 34 renders it possible to greatly increase the effective length of the shell 2, and hence the effective length of the aforediscussed nip or nips, by the simple expedient of heating the end portions 37 (either entirely or in part) at least substantially independently of the heating means for the median portion of the shell. As a rule, the effective length of the shell 2 will include at least 50 percent of the axial length of each insert E. At the very least, the effective length of the surface 6 will be that between the center of the illustrated bearing 20 and the center of the bearing in the other end portion 37 of the shell 2. In many instances the effective length of the improved roll 1 will be that between the shoulders 7 of the shell 2.

The conduit V can supply heated fluid to the channels 35 in each end portion 37 of the shell 2. Alternatively, an additional second heating device 34 can be provided to ensure adequate heating of the right-hand end portion of the shell 2.

An important advantage of the improved roll 1 is that the effective axial length of the shell 2 is not much less than, or even matches, the actual axial length of the shell. In addition, it is much simpler to adequately heat the median portion of the shell 2 by the primary or first heating device via conduits L1 to L4 because the transfer of heat from the median portion to the end portions 37 of the shell is minimal or nil.

Another important advantage of the improved roll 1 is that its overall length can be reduced in comparison to that of conventional rolls which are without a discrete second heating device for the end portions of the shell. This is due to the fact that the effective axial length of the shell 2 more closely approximates or even matches the actual axial length. Therefore, the width of the frame for the improved roll 1 can be reduced accordingly with attendant drastic reduction of space requirements of the entire machine in which the improved roll is put to use. The overall length of a roll which is to cooperate with one or more additional rolls to define one or more nips of predetermined length, and which embodies a discrete second heating device for the end portions of its shell, is much less than the length of a standard roll wherein the end portions of the shell are heated only indirectly (by exchanging heat with the median portion) or are not heated at all. It is preferred to select the second heating device 34 in such a way that it adequately heats at least 50 percent of the axial length of those portions of the shell 2 which surround the inserts E. As mentioned above, the heating action of the device 34 can be selected in such a way that the heating action is adequate all the way to the shoulders 7, i.e., along 100 percent of the axial length of those portions of the shell which surround the inserts E.

An advantage of the pump 44 is that it prevents stagnation of hydraulic fluid in the paths leading to the channels 35 and from the channels 36. This enhances the predictability of heating action upon the end portions 37 of the shell 2. The illustrated pump 44 relies on the action of centrifugal force upon the jets of fluid which issue from the orifice(s) of the nozzle or nozzles 47 and penetrate into the oncoming extensions 43 of the inlets 40 leading to the respective ends of the heating channels 35.

The pump 44 operates satisfactorily even though the inlets 40 of the heating channels 35 are closely adjacent the passages or outlets 41 for evacuation of spent fluid from the channels 36. The reason is that the intake ends of the inlets 40 are located radially inwardly of the intake ends of channels or passages 41. Thus, the radial component of the flow of heated fluid into the channels 35 is greater than the radial component of the flow of spent fluid which leaves the channels 36.

Each inlet 40 directly receives a jet or streamlet of pressurized hydraulic fluid from the orifice of the illustrated nozzle 47 once during each revolution of the shell 2 with reference to the carrier 3. In addition, each inlet 40 can receive pressurized fluid from the annular chamber which is located radially inwardly of the inlets 40 during each stage of each revolution of the shell 2. This ensures a practically uninterrupted flow of heated fluid into the channels 35. Direct propulsion of jets of hot pressurized fluid into the inlets 40 during each revolution of the shell 2 ensures predictable circulation of such fluid along the paths which are defined by the heating channels 35, by the associated connecting channels 39 and by the respective channels 36. If the carrier 3 is provided with two or more fluid-discharging nozzles 47, each inlet 40 directly receives two or more jets of pressurized heating fluid during each revolution of the shell 2.

The channels 35, 36 need not extend into the main or median portion of the shell 2 because the median portion is adequately heated by fluid which is admitted to the hydrostatic bearing elements 8 and/or 9. As mentioned above, the channels 35 receive sufficient quantities of heated fluid because their inlets 40 are in direct alignment with the orifice of each nozzle 47 once during each revolution of the shell 2 and because the inlets 40 can receive heated fluid from the annular chamber which is adjacent the intake ends of extensions 43 during each and every stage of each revolution of the shell relative to the carrier 3.

The outlets or passages 41 of the channels 36 are axially offset with reference to the inlets 40 and their extensions 43 so that heated fluid which is admitted by the orifice(s) of the nozzle or nozzles 47 cannot penetrate into the outlets 41 and thus cannot interfere with the flow of spent fluid from the channels 36 into the median portion of internal space 17 in the shell 2.

Cooling of the lubricant which is supplied to the bearings 20 of the inserts E by the pump 21 and conduit V is desirable and advantageous when the temperature of heated fluid which is supplied to the hydrostatic bearing elements 8 and 9 is in excess of 250° C., e.g., between 250° and 350° C. As a rule, the lubricant (e.g., oil) for standard antifriction or friction bearings cannot stand such elevated temperatures. The cooling device 22 ensures that the temperature of lubricant which is admitted to the bearings 20 of the inserts E does not rise above a predetermined maximum acceptable value.

The bearings 20 are disposed outwardly of the respective sealing means 26. This is desirable and advantageous because the sealing means 26 are less sensitive to elevated temperatures than the lubricant which is supplied to the bearings 20. Thus even though cooling of lubricant for the bearings 20 could prevent adequate heating of the respective parts of the end portions 37, the second heating device 34 invariably ensures adequate heating of those parts of the end portions 37 which surround the sealing means 26. This guarantees that the effective length of the shell 2 is not less than that between the two bearings 20, even under the most adverse circumstances when the cooling of lubricant for the bearings 20 presents adequate heating of adjacent parts of the end portions 37. It has been found that, at least in many instances, cooling of lubricant for the bearings 20 does not prevent the second heating device 34 from properly heating the entire end portions 37 of the shell 2, i.e., all the way to the shoulders 7.

The purpose of sealing means 26 is to prevent a mixing of lubricant for the bearings 20 with hydraulic fluid which is supplied to the channels 35 and hydrostatic bearing elements 8 and 9. Though the sealing means 26 contribute to axial length of the inserts E, and hence to the axial length of the roll 1, such increase of axial length is warranted in view of the beneficial effect of sealing means 26 upon the quality of lubricant for the bearings 20 and upon the quality of hydraulic fluid for admission into the channels 35 and hydrostatic bearing elements 8, 9. Moreover, the second heating device 34 ensures that the end portions 37 of the shell 2 are adequately heated in spite of increased axial length of the inserts E due to the provision of sealing means 26. It has been found tht the provision of sealing means 26 with plural lips, one of which is adjacent the respective bearing 20 and the other of which is adjacent the median portion of internal space 17 in the shell 2, ensures a highly satisfactory separation of hydraulic heating fluid from cooled lubricant to thus prevent contamination and/or overheating of lubricant by the hydraulic fluid and/or contamination and/or cooling of hydraulic fluid by the lubricant.

FIGS. 4 to 6 show a portion of a modified roll 101. Many parts of this modified roll which are identical with or clearly analogous to corresponding parts of the roll 1 are denoted by similar reference characters plus 100.

The second heating device 134 of the roll 101 has heating channels 135 and 136 in the form of axially parallel grooves which are provided in the peripheral surface of an inner tubular section 142 forming a separately produced part of the respective end portion 137 of the shell 102. The outer tubular section of the end portion 137 is integral with the median portion of the shell 102. Those end portions of pairs of neighboring channels 135, 136 which are adjacent the end face of the respective end portion 137 of the shell 102 communicate with each other by way of a circumferentially extending connecting channel 139 which is a groove machined into or otherwise formed in the peripheral surface of the inner tubular section 142. The length of the inlets 140 of heating channels 135 (in the radial direction of the shell 102) considerably exceeds the length of fluid discharging outlets or passages 141 of the channels 136. This results in the provision of a centrifugal pump 144. The outlets 141 discharge spent hydraulic fluid into the internal space 17 of the shell 102, and the inlets 140 receive heated hydraulic fluid from the orifice or orifices of one or more nozzles 47 in the carrier 3.

An advantage of the roll 101 is that the making of grooves or channels 135 and 136 in the peripheral surface of the inner tubular section 142 of each end portion 137 of the shell 102 (e.g., in a milling machine) is a relatively simple and inexpensive operation. Moreover, the weight of an inner tubular section 142 is a small fraction of the weight of a shell 102; this also contributes to lower cost of the making of grooves or channels 135, 136 and 139 (as compared with the cost of drilling bores or holes in the end faces of the shell 2 in order to form the channels 35, 36 which are shown in FIGS. 1 to 3).

Figure 8:
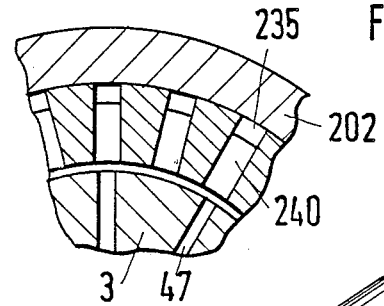
FIG. 8 is a fragmentary transverse sectional view as seen in the direction of arrows from the line E—E of FIG. 7.

FIGS. 7 and 8 show a portion of a third roll 201. Many parts of this roll which are identical with or clearly analogous to corresponding parts of the roll 1 of FIGS. 1 to 3 are denoted by similar reference characters plus 200. The roll 201 constitutes a modification of the roll 101 because each end portion 237 of the shell 202 comprises an outer tubular section which is integral with the median portion of the shell and an inner tubular section 242 which is a separately produced part and has a peripheral surface provided with axially parallel heating channels 235 having radially extending inlets 240 at those ends which are remote from the respective end face of the shell 202. The outlets 241 for the channels 235 are provided in the ring 231 and serve to deliver spent fluid into an annular evacuating chamber 248 having at least one outlet connected to a conduit (not specifically shown) which returns the fluid to the source 19.

The carrier 3 is provided with one or more nozzles 47 having orifices which discharge heated fluid into the inlets 240 of successive heating channels 235 when the shell 202 rotates relative to the carrier.

A radially extending partition 249 is provided in the shell 202 to seal the median portion of the internal space 17 from the outer portion of such space, namely from the portion which accommodates the insert E in the respective end portion 237 of the shell 202. The nozzle or nozzles 47 actually deliver heated fluid into an annular chamber between the internal surface 250 of the tubular section 242 and the adjacent portion of the peripheral surface of the carrier 3. Heated fluid which is discharged by the nozzle or nozzles 47 is acted upon by centrifugal force so that it tends to flow radially outwardly and enters the innermost portions of inlets 240 in the internal surface 250 of the tubular section 242. Centrifugal force reduces the likelihood of extensive flow of heated fluid from the nozzle or nozzles 47, along the partition 249 and into the median portion of the internal space 17.

An advantage of the roll 201 is the simplicity of the second heating device 234. Thus, spent fluid which reaches the left-hand ends of the heating channels 235 simply flows into the evacuating chamber 248 (the left-hand axial end of each channel 235 is open) which is adjacent the respective axial end of the shell 201 and is readily connectable with a conduit for return flow of spent fluid into the source 19.

The partition 249 ensures that the annular chamber which is surrounded by the internal surface 250 of the tubular section 242 of the illustrated end portion 237 of the shell 202 is invariably filled with a supply of heated fluid which flows into the inlets 240 of the channels 235 under the action of centrifugal force during each and every stage of each revolution of the shell 202 about the carrier 3.

Figure 9:
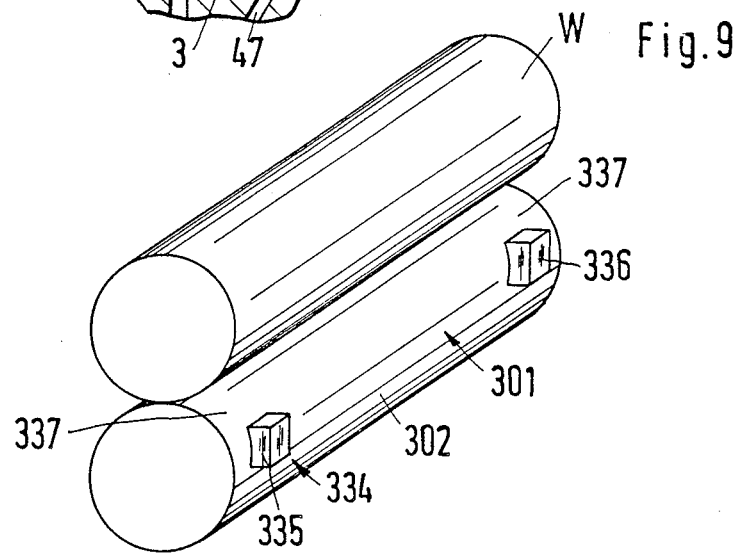
FIG. 9 is a schematic perspective view of a pair of rolls one of which is provided with external heating means for the end portions of its shell.

FIG. 9 shows a portion of a calendar or an analogous machine wherein a roll 301 cooperates with a second roll W to define an elongated nip for a web of paper, plastic, textile or other material. The median portion of the shell 302 of the roll 301 is or can be heated in the same way as the roll 1 of FIGS. 1 to 3. However, the second heating device 334 comprises two stationary inductive heaters 335, 336 which are outwardly adjacent the respective end portions 237 of the shell 302. Each of the heaters 335, 336 can comprise an electromagnet which is connected to a source of alternating current and serves to generate, by induction, eddy currents in the respective end portions 337 of the shell 302. The latter is made of steel. Such mode of heating also ensures that the temperature of the end portions 337 will match or closely approximate the temperature of hydraulically heated median portion of the shell 302.

The inductive heaters 335, 336 can be installed on and can rotate with the respective end portions 337 of the shell 302. This does not present problems when the machine which embodies the rolls 301, W of FIG. 9 is in actual use because, in many instances, the effective width of the web which is caused to advance through the nip of rolls in a calender or in a like machine is much less than the axial length of the rolls.

Inductively heated rolls are disclosed, for example, in German Offenlegungsschrift No. 33 40 683.

FIGS. 10 to 12 show a portion of a fourth roll 401. Many parts of this roll which are identical with or clearly analogous to corresponding parts of the roll 1 of FIGS. 1 to 3 are denoted by similar reference characters plus 400. The main difference between this embodiment and the previously described embodiments is that the second heating device 434 includes component parts of the inserts E, namely annular hydrostatic radial bearings 450 and annular hydrostatic axial or thrust bearings 451 for the respective end portions 437 of the shell 402. The means for supplying heated hydraulic fluid to the illustrated radial bearing 450 comprises a conduit L6 in the carrier 3, and the means for supplying heated hydraulic fluid to the illustrated axial bearing 451 comprises a conduit L7 in the carrier.

The radial bearing 450 comprises an outer bearing ring 452 and an inner bearing ring 456 within the outer bearing ring. The peripheral surface 453 of the outer bearing ring 452 has two annuli of pockets 454 which are adjacent the respective outer portion of the internal surface of the shell 402. The outer bearing ring 452 has a spherical (concave) internal surface 455 which abuts the adjacent spherical (convex) external surface of the inner bearing ring 456. The two spherical surfaces define an annular fluid distributing chamber 457 which receives heated fluid from radially extending channels 458 in the inner bearing ring 456 and discharges heated fluid into the pockets 454 by way of fluid throttling passages 459 in the outer bearing ring 452. The fluid distributing chamber 457 can consist of an annulus of discrete recesses or depressions in the spherical internal surface 455 of the outer bearing ring 452 and/or in the spherical external surface of the inner bearing ring 456.

The channels 458 receive heated fluid from the conduit L6 in the carrier 3. These channels are disposed in a common plane which is normal to the axis of the shell 402 and also includes the discharge end of the conduit L6.

Heated fluid which flows from the conduit L6 into the channels 458 and thence into the chamber 457 on its way into the pockets 454 via throttling passages 459 leaks along the external surface 453 of the outer bearing ring 452 and enters the median portion of the internal space 17 or an annular fluid evacuating chamber 460 whence it flows into a conduit R3 serving to return spent fluid into the source 19. The pockets 454 in the peripheral surface 453 of the outer bearing ring 452 can be assembled into one, three or more annuli.

The hydrostatic axial bearing 451 which is shown in FIGS. 10 and 12 comprises a ring-shaped member 461 (hereinafter called wall) which is affixed to the internal surface of the respective end portion 437 of the shell 402. This wall is disposed between and is rotatable relative to two thrust bearing rings 462, 463 surrounding a ring-shaped barrier 472 on the respective end portion of the carrier 3. The bearing rings 462, 463 have radially extending surfaces 464 which abut the respective sides or surfaces of the wall 461 and are provided with annuli of pockets 465 (see particularly FIG. 12) for reception of heated fluid which heats the wall 461 and hence the respective end portion 437 of the shell 402. Each pocket 465 (each of the bearing rings 462, 463 is assumed to have six identically dimensioned and configurated pockets) is an arcuate recess in the surface 464 of the respective bearing ring. The pockets 465 alternate with radially extending channels 466.

The bearing rings 462, 463 have spherical (convex) surfaces 467 which abut complementary spherical (concave) surfaces of neighboring supporting rings 468, 469 traversed by channels 470. The receiving ends of the channels 470 communicate with the outlet of the supply conduit L7 in the carrier 3. The bearing rings 462 and 463 are provided with throttling passages 471 defining paths for the flow of heated fluid into the respective sets of pockets 465.

The supporting rings 468, 469 are integral with or are rigidly connected to the aforementioned ring-shaped barrier 472 which is surrounded by a substantially sealed inner annular chamber 473. The arrangement is preferably such that the barrier 472 has two mirror symmetrical halves one of which is integral with the supporting ring 468 and the other of which s integral with the supporting ring 469. The inner annular chamber 473 communicates only with the aforementioned radial channels 466 which alternate with the pockets 465 of the bearing rings 462 and 463. The outer ends of the channels 466 communicate with outer annular chambers 474 and 460 which, in turn, communicate with a return conduit R3 in the carrier 3. Heated hydraulic fluid which is admitted into the pockets 465 leaks along the respective sides of the wall 461 and enters the channels 466 to flow into the outer annular chambers 460, 474 and thence into the source 19 by way of the conduit R3. Such mode of establishing paths for the flow of heated fluid ensures a highly satisfactory exchange of heat between the fluid and the wall 461 which, in turn, exchanges heat with the respective end portion 437 of the shell 402. The fluid also heats the ring 431 which exchanges heat with the respective end portion 437 in immediate proximity of the respective shoulder 7 in the external surface 6 and of the respective end face of the shell 402.

An advantage of the roll 401 is that the end portions 437 of the shell 402 can be heated to elevated temperatures because the radial bearings 450 and/or the axial bearings 451 can transmit large quantities of heat in a highly predictable manner. Moreover, heated fluid which is supplied via conduits L6 and L7 serves the dual purpose of lubricating the bearings 450, 451 and of heating the end portions 437 of the shell 402. Each of the bearings 450, 451 defines for the heated fluid paths which extend along the internal surface of the shell 402 and/or along the internal surfaces of parts (such as 431 and 461) which are in intimate contact with the shell to thus ensure a highly satisfactory exchange of heat.

The radial bearings 450 exhibit the advantage that they deliver heated fluid into direct contact with the shell 402 because the pockets 454 are provided in the peripheral surface 453 of the outer bearing ring 452 which is immediately adjacent the respective end portion 437 of the shell. The spherical surfaces 455 enable the end portions 437 of the shell 402 to change their inclination with reference to the carrier 3 in response to admission of pressurized fluid into one or more groups or sets of hydrostatic bearing elements 8 and/or 9. Still further, delivery of heated fluid to the pockets 454 necessitates the provision of relatively simple fluid supplying or conveying means.

The axial hydrostatic bearings 451 exhibit the advantage that the walls 461 can practically pinpoint the delivery of heat to selected portions of the internal surface of the shell 402 within the respective end portions 437. The annular chamber 473 serves to gather heated fluid which flows radially inwardly from the pockets 465, and the thus gathered fluid heats the adjacent portions of the bearing rings 462, 463 to thus increase the quantity of heat which is transferred form the rings 462, 463 to the wall 461 and thence to the respective end portion 437 of the shell 402. As already explained above, the inner annular chamber 473 is substantially sealed and can deliver fluid only to the channels 466 which deliver the fluid to the outer annular chambers 460 and 474 in order to directly heat the end portion 437 and the ring 431, respectively. The provision of radial channels 466 between the pockets 465 of the bearing rings 462, 463 contributes to simplicity and lower cost of the axial bearing 461.

The supporting rings 468, 469 cooperate with the respective bearing rings 462, 463 to enable the end portions 437 of the shell 402 to change their inclination with reference to the adjacent portions of the carrier 3 because the surfaces 467 between the supporting rings 468, 469 and the respective bearing rings 462, 463 are spherical surfaces. Moreover, the supporting rings 468, 469 define channels 470 for heating fluid which is supplied by the conduit L7.

The improved roll is susceptible of many additional modifications without departing from the spirit of the invention. For example, the illustrated second heating devices can be replaced with other suitable heating devices. In addition the second heating device 334 of FIG. 9 can be used in conjunction with the second heating device 34, 134, 234 or 434. Still further, the first heating device (for the median portion of the shell) need not. necessarily include the hydrostatic bearing elements 8 and/or 9 but can include channels in the median portion of the shell and/or electrical heating means. These are but a few examples of possible modifications which will occur to those having the required skill in the art.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range or equivalence of the appended claims.

We claim:

1. A roll for use in web treating machines comprising a hollow rotary tubular shell having a longitudinal axis and internal space and first and second end portions each including a tubular section; first and second inserts installed in said space within said first and second end portions, respectively; a first heating device having means for heating said shell between said inserts; and a discrete second heating device having means for heating said shell in the region of said end portions, said second heating device including channels provided in the end portions of said shell and centrifugal pumps for circulating a heating fluid through said channels, said tubular sections forming part of the respective pumps.

2. The roll of claim 1, wherein said shell has a cylindrical external surface, and further comprising a carrier for said shell, said shell surrounding and being rotatable relative to said carrier, said first heating device comprising hydrostatic bearing elements in said space between said inserts, a source of hydraulic fluid, means for heating the fluid, and means for conveying fluid from said fluid heating means to said bearing elements.

3. The roll of claim 1, wherein each of said inserts takes up a predetermined length of said space in the axial direction of said shell, said shell having a cylindrical external working surface extending around said space intermediate said inserts and also along at least 50 percent of each predetermined length of said space.

4. The roll of claim 1, wherein said channels are provided only in the end portions of said shell.

5. The roll of claim 4, wherein said channels are at least substantially parallel to the axis of said shell and are adjacent each other in a circumferential direction in the respective end portion.

6. The roll of claim 4, wherein said channels include bores in the end portions of said shell.

7. The roll of claim 4, wherein each tubular section comprises an outer tubular section and an inner tubular section within the respective outer tubular section, said channels being disposed between the outer and inner tubular sections of said end portions.

8. The roll of claim 4, wherein each end portion of said shell has an end face and said channels have open ends in the end faces of the respective end portions, each of said pumps including at least one substantially radially extending passage communicating with the channels of each of said end portions.

9. The roll of claim 1, wherein each of said pumps has substantially radially disposed orifice which discharge heated fluid into at least some of said channels.

10. The roll of claim 9, wherein said orifices have intake ends in the region of the internal space of said roll.

11. The roll of claim 1, wherein said second heating device further comprises at least one source of heated fluid, means for regulating at least one parameter of heated fluid, and means for conveying heated fluid from said regulating means to the end portions of said shell.

12. The roll of claim 11, wherein the at least one parameter is the temperature of heated fluid.

13. The roll of claim 11, wherein the at least one parameter is the pressure of heated fluid.

14. The roll of claim 1, wherein each tubular section comprises an outer tubular section and an inner tubular section within the respective outer tubular section, each inner tubular section having a peripheral surface adjacent the respective outer tubular section, said channels being provided in the peripheral surface of each inner tubular section, at least one channel of each inner tubular section having a radially inwardly extending inlet and said pumps further comprising means for conveying heated fluid to said inlets.

15. The roll of claim 14, wherein each end portion of said shell has an end face and said inlet are spaced apart from the respective end faces in a direction of the axis of said shell.

16. The roll of claim 1, wherein each of said inserts comprises a bearing for the respective end portion of said shell, and further comprising means for lubricating said bearings including a source of lubricant and means for supplying lubricant from said source to said bearings at a first temperature, said second heating device further comprising means for supplying to the end portions of said shell a heating fluid at a second temperature which is higher than said first temperature.

17. The roll of claim 16, wherein said internal space has a median portion and outer portions for said inserts, each of said inserts further comprising means for sealing the respective outer portion from the median portion of said internal space.

18. The roll of claim 17, wherein each of said sealing means includes a first sealing lip adjacent the respective bearing and a second sealing lip adjacent the median portion of said internal space.

19. A roll for use in web treating machines, comprising a hollow tubular shell having a longitudinal axis and having an internal space and first and second end portions, each of said end portions having an end face; first and second inserts installed in said space within said first and second end portions, respectively; a first heating device having means for heating said shell between said inserts; and a discrete second heating device having means for heating said shell in the region of said end portions, said second heating device including channels provided only in the end portions of said shell and means for circulating a heating fluid through said channels, the channels in each of said end portions including at least one first channel, at least one second channel and a third channel connecting the first and second channels in the region of the respective end face, said circulating means including at least one fluid admitting inlet to the first channel in each end portion of said shell and at least one fluid receiving passage communicating with the second channel in each end portion of said shell.

20. The roll of claim 19, wherein said passages are remote from the respective end faces, said inlets being nearer to and said passages being more distant from the axis of said shell.

21. A roll for use in web treating machines, comprising a hollow tubular shell having a longitudinal axis and having an internal space and first and second end portions; a carrier for said shell; first and second inserts installed in said space within said first and second inserts installed in said space within said first and second end portions, respectively; a first heating device having means for heating said shell between said inserts; and a discrete second heating device having means for heating said shell in the region of said end portions, said second heating device comprising at least one source of heated fluid, means for regulating at least one parameter of heated fluid, and means for conveying heated fluid from said regulating means to the end portions of said shell, said conveying means comprising at least one passage for heated fluid in said carrier, at least one first fluid discharging nozzle communicating with said passage in the region of one of said end portions and at least one second fluid discharging nozzle communicating with said passage in the region of the other of said end portions, said second heating device further comprising heating channels provided in each end portion of said shell and having fluid-receiving inlets in register with the respective nozzles.

22. The roll of claim 21, where said shell has an internal surface including a median portion located at a first distance from the axis of the shell and outer portions disposed within said end portions and located at a lesser second distance from said axis, said inlets having fluid receiving ends in the respective and portions of said internal surface.

23. The roll of claim 22, further comprising partitions provided in said shell and dividing said internal space into a central portion which is surrounded by the median portion of said internal surface and outer portions within the outer portions of said internal surface, said partitions being arranged to seal the central portion from the outer portions of said internal space.

24. The roll of claim 21, wherein said second heating device further comprises second channels provided in each of said end portions and communicating with the respective heating channels, said second channels having fluid-discharging outlets which are axially offset with reference to the inlets of the respective heating channels.

* * * * *